Aug. 7, 1945.  J. P. BENOIT  2,381,798
ARTICLE CONVEYING MECHANISM
Filed March 25, 1942  15 Sheets-Sheet 2

Inventor
J.P.Benoit
By Rule and Hoge,
Attorney

Aug. 7, 1945.  J. P. BENOIT  2,381,798
ARTICLE CONVEYING MECHANISM
Filed March 25, 1942  15 Sheets-Sheet 4

Inventor
J. P. Benoit
By Rule and Hoge,
Attorneys

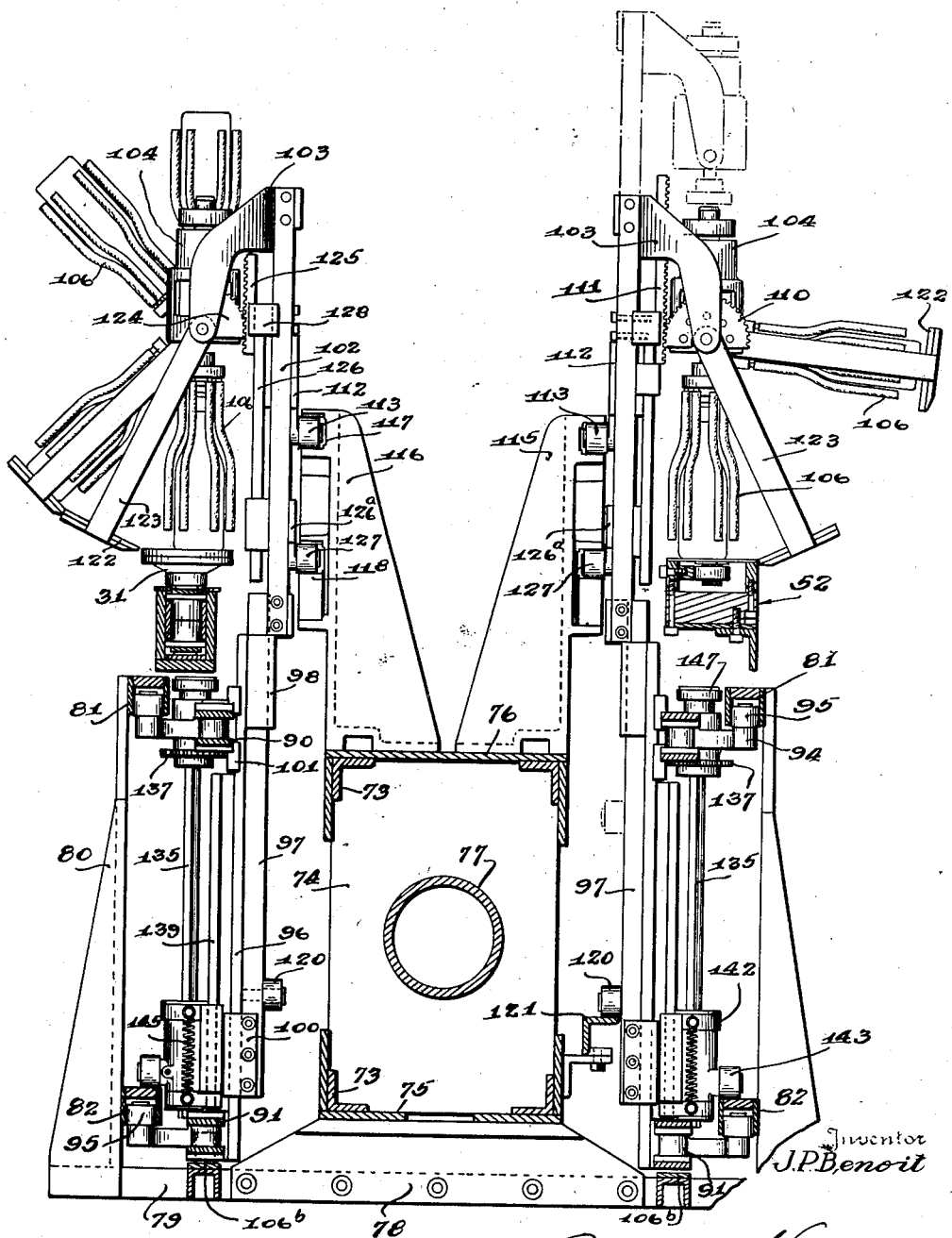

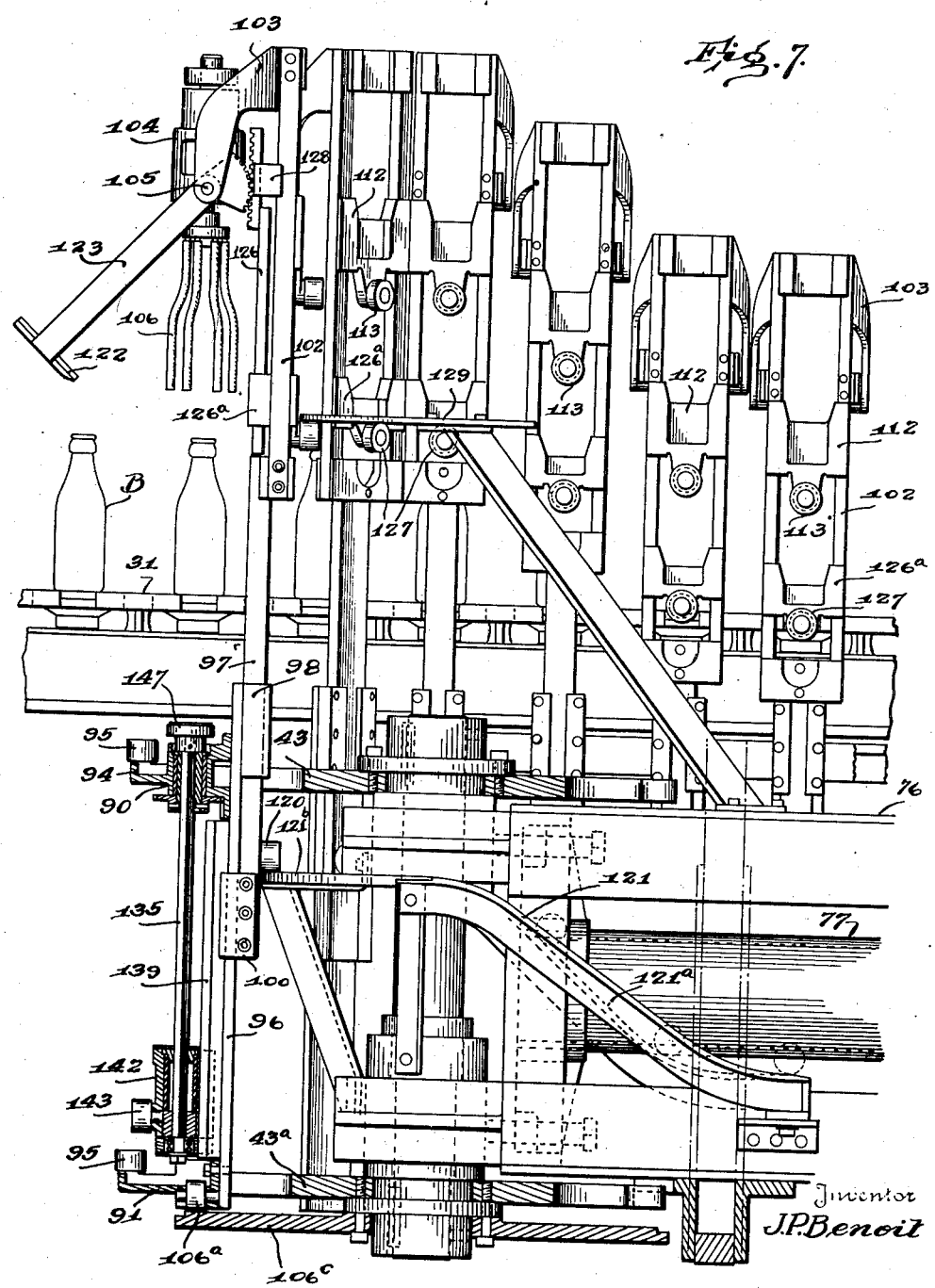

Aug. 7, 1945.  J. P. BENOIT  2,381,798
ARTICLE CONVEYING MECHANISM
Filed March 25, 1942  15 Sheets-Sheet 7
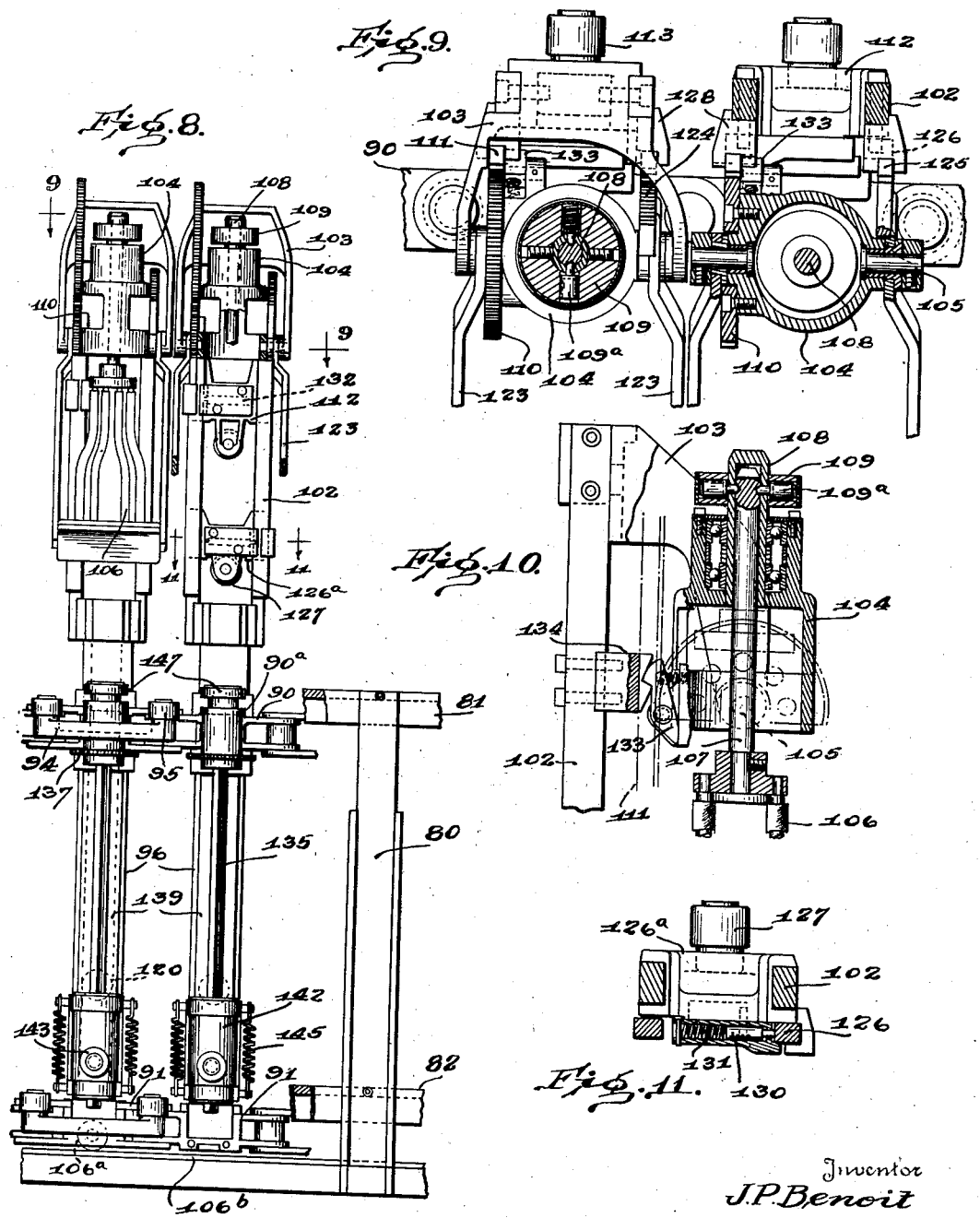
Inventor
J. P. Benoit
By Rule and Hoge,
Attorneys

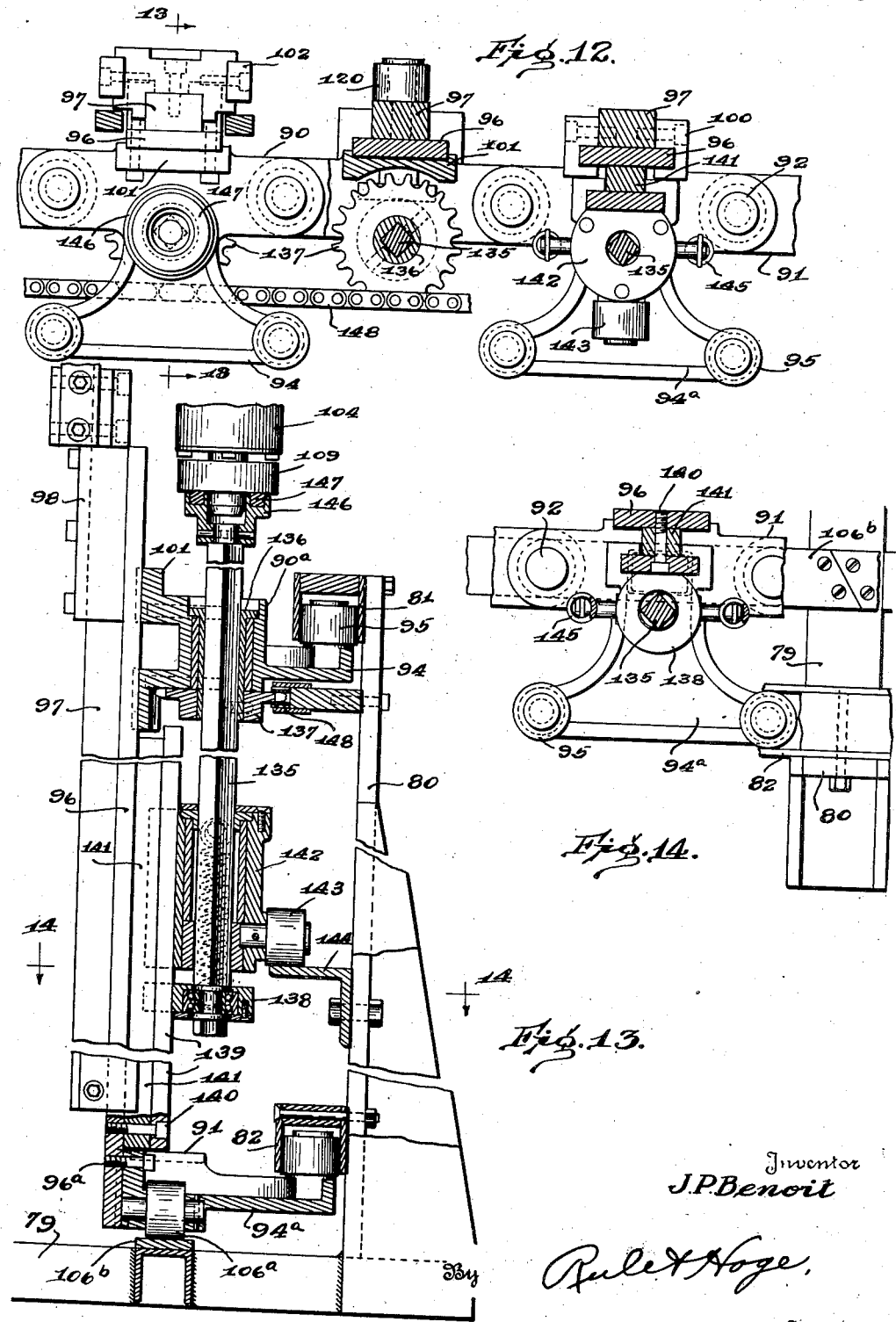

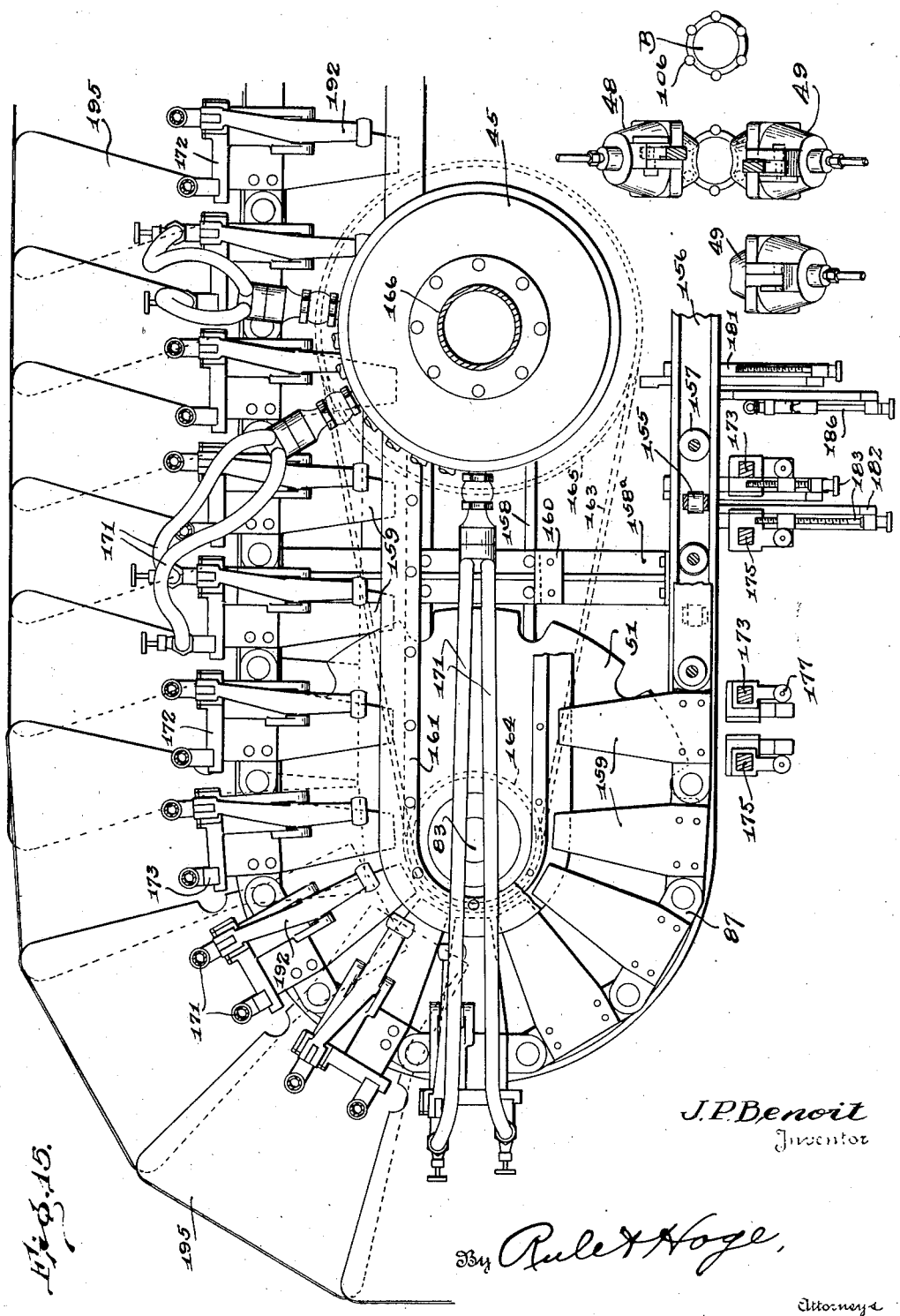

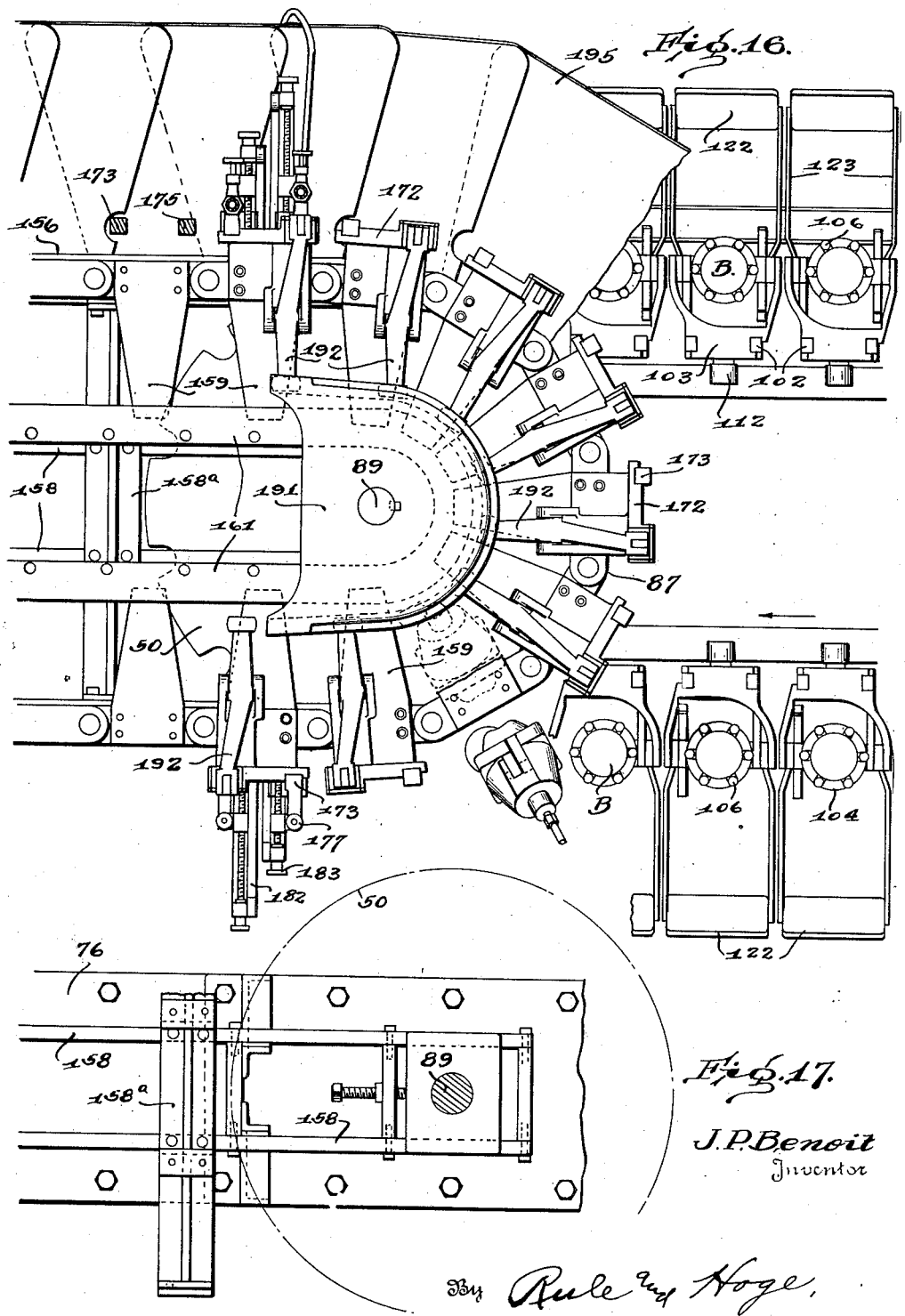

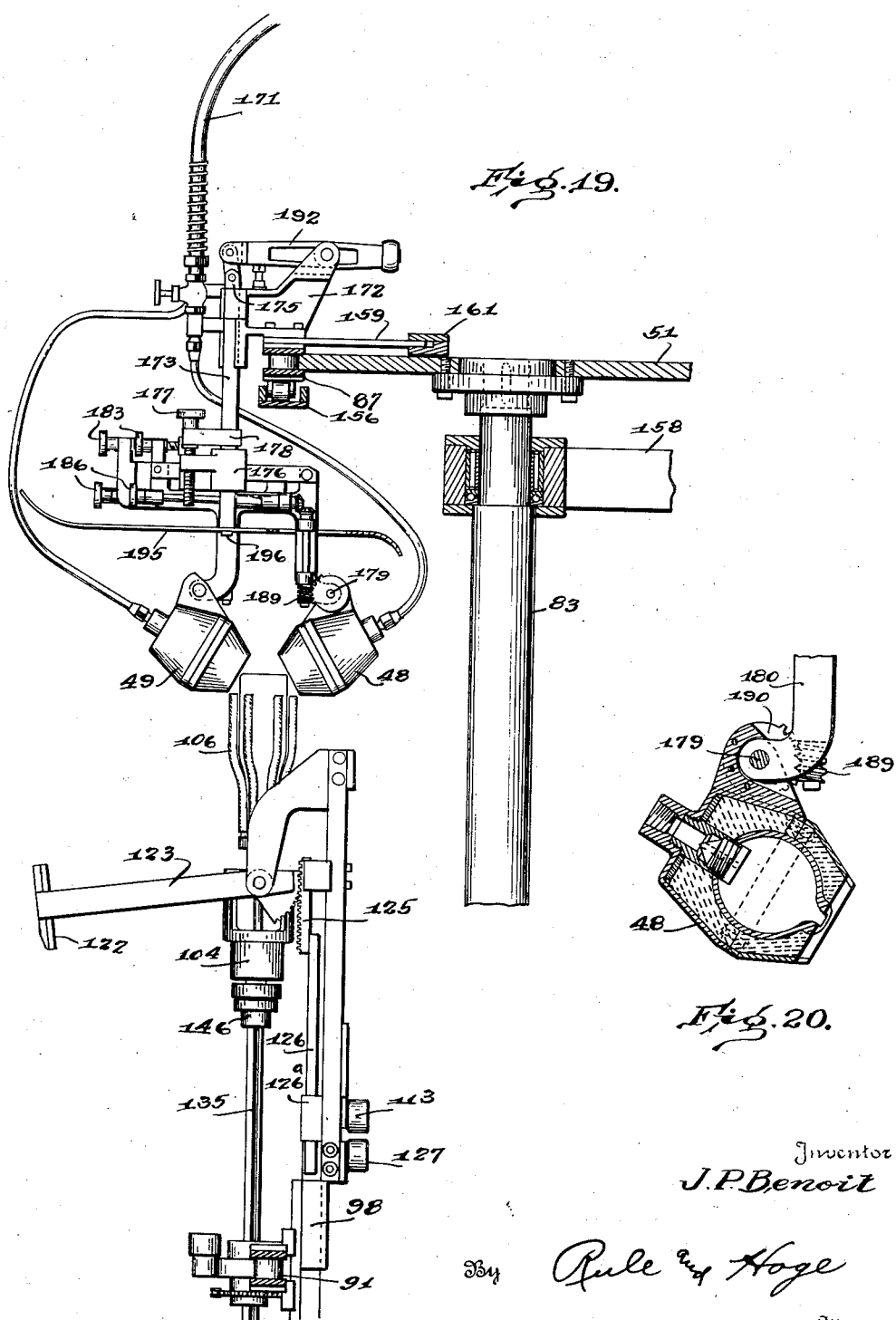

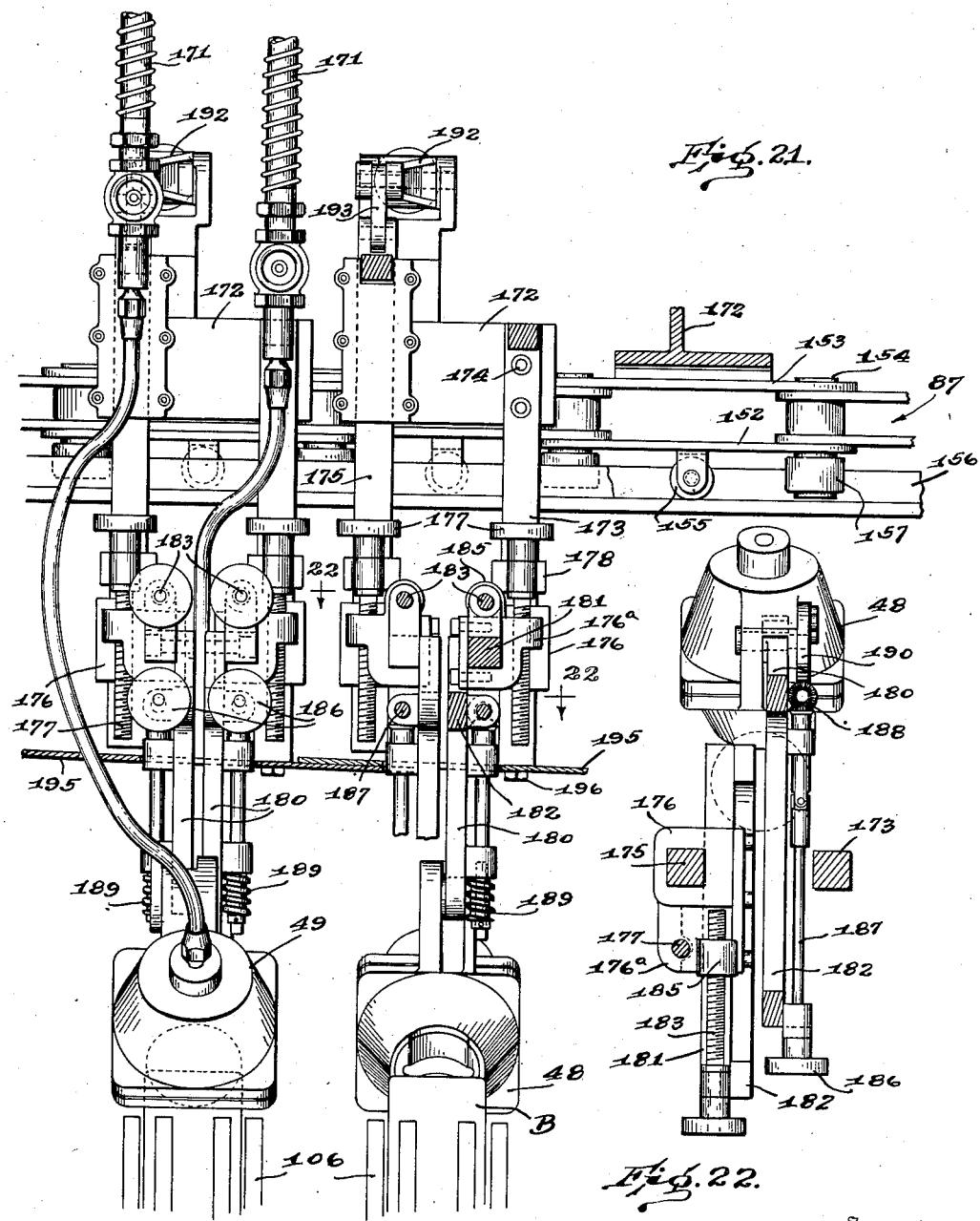

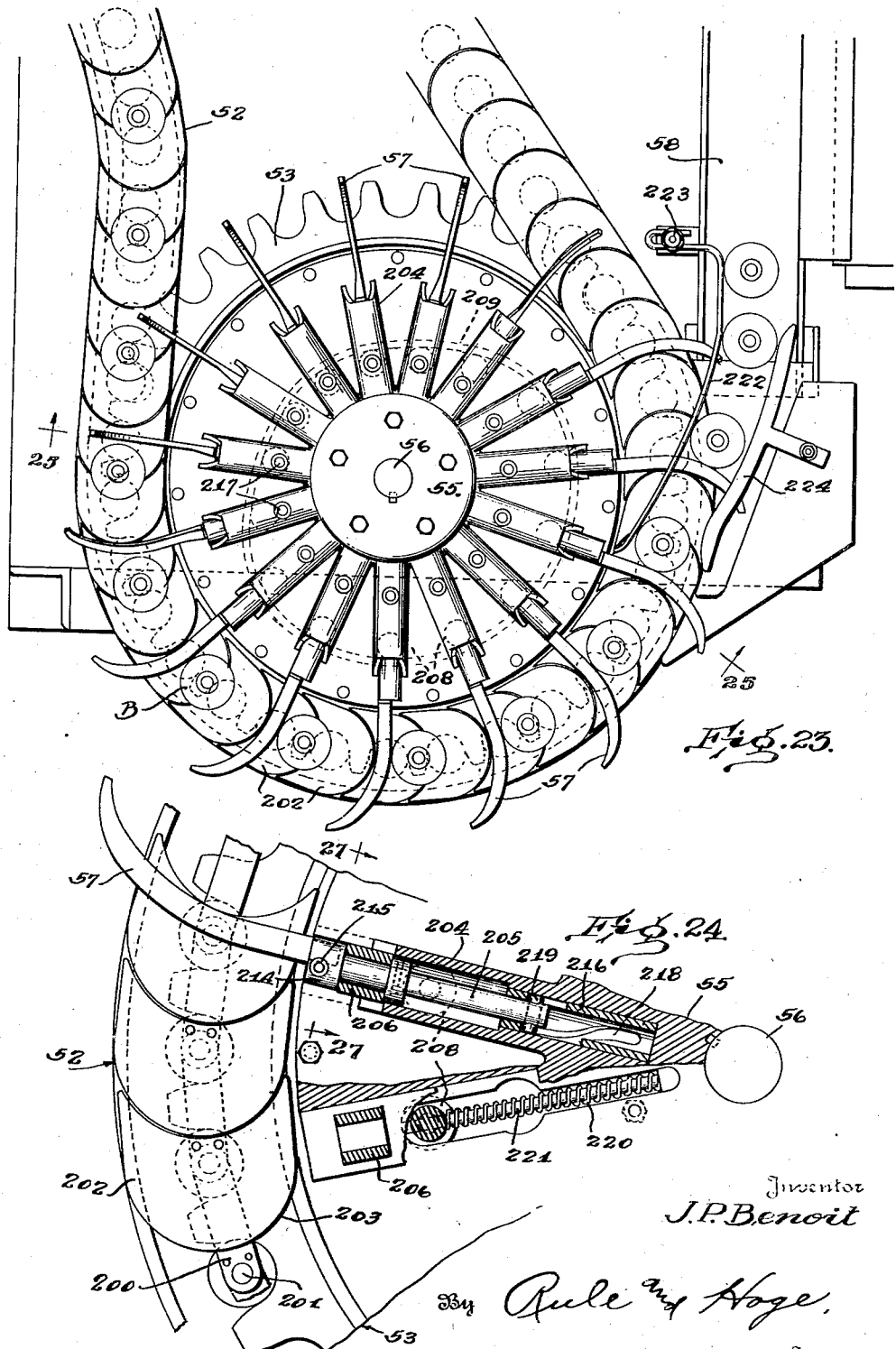

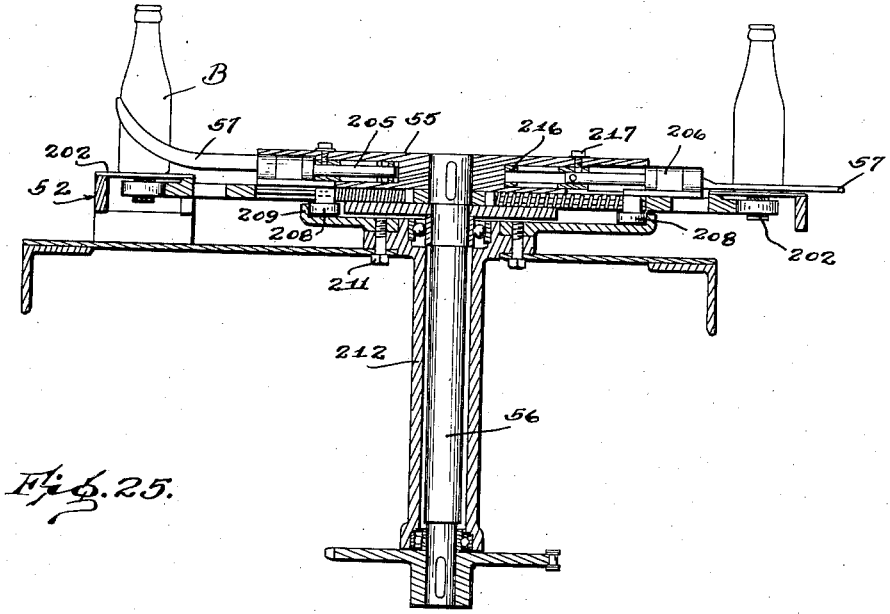
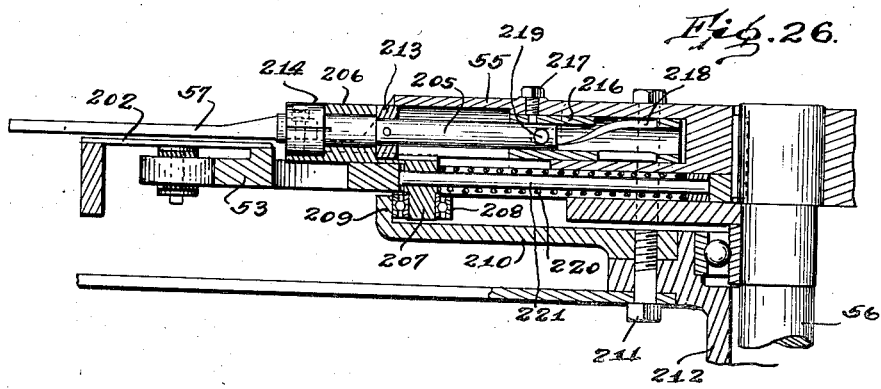
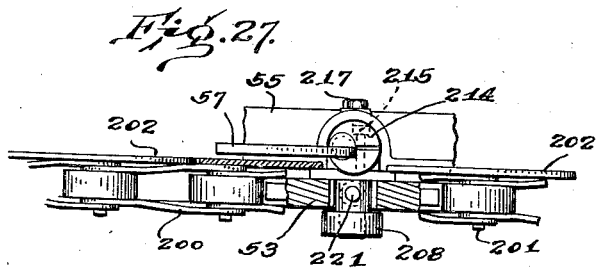

Patented Aug. 7, 1945

2,381,798

UNITED STATES PATENT OFFICE 2,381,798

ARTICLE CONVEYING MECHANISM

Joseph P. Benoit, Alton, Ill., assignor to Owens-Illinois Glass Company, a corporation of Ohio Application March 25, 1942, Serial No. 436,129

23 Claims. (Cl. 49—58)

My invention relates to apparatus for conveying and handling articles and is particularly adapted for conveying bottles, jars, or other glass articles from a forming machine to an annealing leer. The invention in its preferred form as herein illustrated, is adapted for handling glass articles which are subjected to a fire-finishing operation during their transfer to the leer. An object of the invention is to provide article conveying and handling mechanism adapted for cooperation with the fire-finishing apparatus.

In the manufacture of bottles and like articles, which are discharged from the automatic blowing machine in rapid succession, they are immediately transferred to an annealing leer while still at a high temperature. A further object of my invention is to provide an apparatus capable of handling the articles as fast as they are discharged from the blowing machine, such apparatus in its preferred form comprising means for receiving the bottles, setting them in upright position on a conveyor, transferring them from the conveyor to holding means or cradles, inverting the cradles with the articles therein, advancing them with an endless conveyor, subjecting the bottoms of the inverted articles to the action of the burners which are arranged to travel with the articles during the fire-polishing operation, thereafter reinverting the articles and transferring them while supported in upright position to an annealing leer.

Other objects of the invention will appear hereinafter.

Referring to the accompanying drawings:

Fig. 6 is a cross-sectional elevation at the line 6—6 on Fig. 1.

Fig. 7 is a sectional elevation at the line 7—7 on Fig. 1, showing the cradles being lowered to receive the bottles from the uprighter conveyor.

Fig. 8 is a fragmentary sectional elevation showing bottle carriers or cradles and bottle rotating spindles.

Fig. 9 is a section at the line 9—9 on Fig. 8.

Fig. 10 is a fragmentary sectional elevation showing a bottle carrier.

Fig. 11 is a sectional detail at the line 11—11 on Fig. 8 showing a holding detent for a rod which provides a bottom support for the bottle.

Fig. 12 is a fragmentary sectional plan view showing a portion of the endless chain conveyor for the bottle carrier units.

Fig. 13 is a sectional elevation at the line 13—13 on Fig. 12.

Fig. 14 is a fragmentary sectional plan view of parts shown in Fig. 13.

Fig. 15 is a fragmentary plan view showing the gas distributing head and burner units.

Fig. 16 is a fragmentary sectional plan view complementary to Fig. 15.

Fig. 17 is a fragmentary view showing a portion of the framework shown in Figs. 15 and 16.

Fig. 19 is a section at the line 19—19 on Fig. 1 showing a burner unit with the burners in operative relation to the bottle.

Fig. 20 is a section of a burner.

Fig. 21 is a part-sectional side elevation of two adjoining burner units.

Fig. 22 is a section at the line 22—22 on Fig. 21.

Fig. 23 is a fragmentary plan view of the takeoff mechanism by which the fire-finished bottles are transferred from the cradle conveyor to a cross-conveyor from which the bottles are transferred to a leer.

Fig. 24 is a fragmentary part sectional plan view showing particularly the means for actuating the take-off fingers.

Fig. 25 is a section at the line 25—25 on Fig. 23.

Fig. 26 is a fragmentary sectional elevation showing a take-off finger and its operating means.

Fig. 27 is a section at the line 27—27 on Fig. 24 and also showing a portion of the driving chain for the take-off mechanism.

Figure 1:
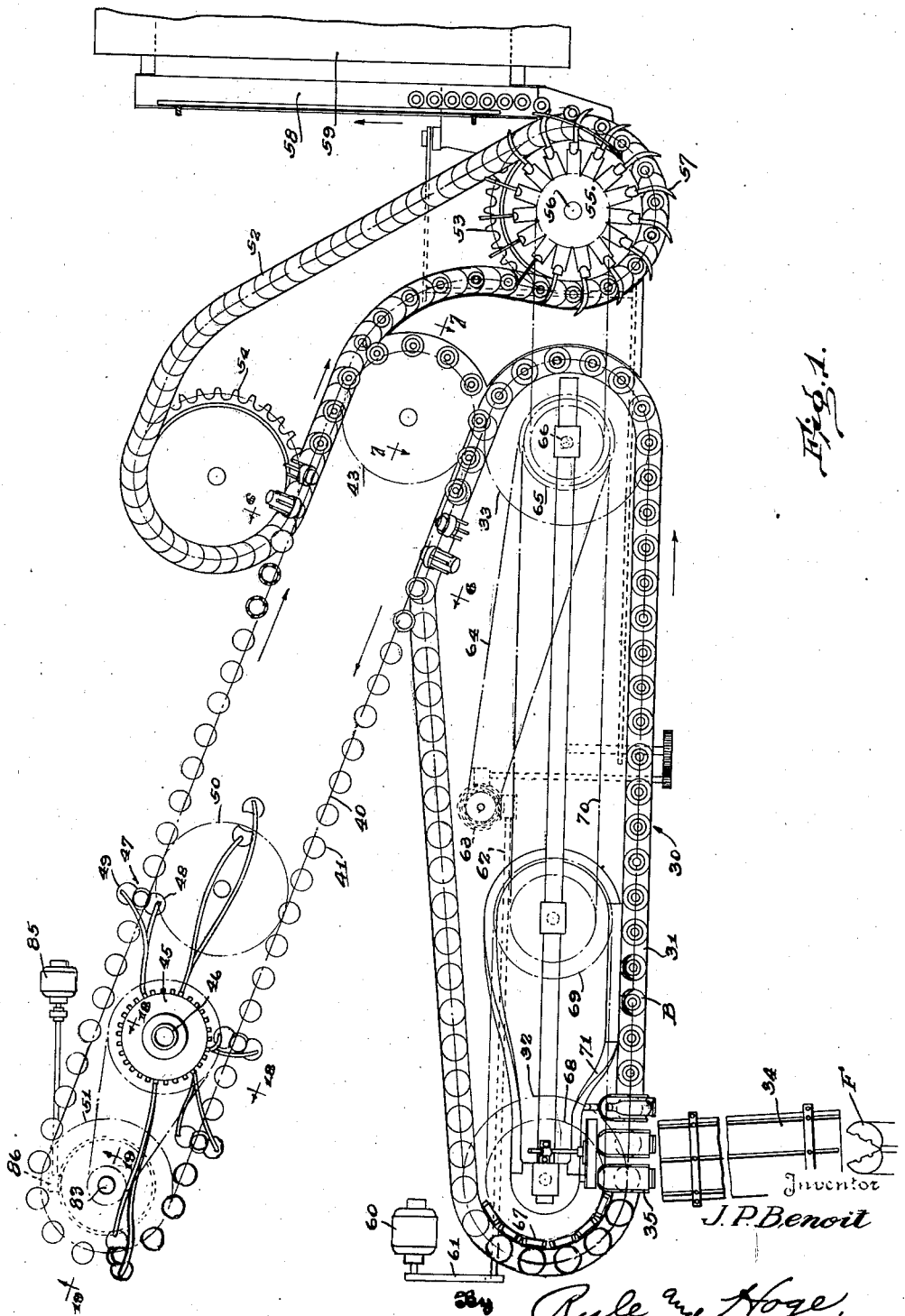
Fig. 1 is a diagrammatic plan view of apparatus designed for practicing my invention.

Referring particularly to Fig. 1, the general construction and arrangement of parts is as follows: An uprighter mechanism 30 includes an endless carrier 31 which is trained over gear wheels 32 and 33. The bottles B are discharged from the finishing molds F of the bottle blowing machine onto an inclined chute 34 by which they are transferred to uprighters or cradles 35 which swing the bottles to an upright position and place them on the continuously traveling carrier 31. The construction and operation of the uprighter mechanism are substantially as disclosed in my Patent 1,981,642, November 20, 1934, and need not be described in detail.

The bottles are transferred from the uprighter conveyor to a cradle conveyor 40 comprising cradle units 41. Each said unit comprises a bottle carrier or cradle. The conveyor 40 is trained over driving means including a sprocket gear wheel 44 (Fig. 2) and driven means comprising a sprocket wheel 43. The cradles 41 are arranged to be brought over the bottles on the uprighter conveyor and lowered in succession to receive the bottles, are then inverted to invert the bottles and carry them in inverted position thru the fire-finishing zone where the bottoms of the bottles are fire-finished.

The fire-finishing mechanism includes a fuel gas distributor 45 mounted for rotation about a vertical column 46. A series of fire-finishing units 47 each comprising a pair of burners 48 and 49, are connected in an endless chain trained around the gear wheels 50 and 51. Each pair of burners has pipe connections with the distributor 45 thru which the fuel gases are supplied to the burners. The pairs of burners are brought in succession into cooperative relation to the inverted bottles as the latter advance with the conveyor 40. The burners operate as hereinafter described to fire-finish or glaze the bottoms of the bottles which are thereafter transferred to the take-off mechanism including an endless take-off conveyor 52 which is trained over a driving gear 53 and a driven gear 54. A take-off device 55 or spider which is keyed on the drive shaft 56 of the gear 53, carries radial fingers 57 for transferring the bottles from the take-off conveyor to a carrying in belt conveyor 58. The latter extends across the front end of an annealing leer 59 to which the bottles are transferred from the conveyor 58 by conventional mechanism (not shown).

The inverted bottles after passing thru the fire-finishing zone are reinverted while carried by the cradles 41 and placed in upright position on the take-off conveyor 52.

The uprighter mechanism is driven by an electric motor 60 having driving connections with the conveyor 31, including sprocket chain 61, shaft 62, worm gearing 63, sprocket chain 64, sprocket gear 65 and the shaft 66 of the driving sprocket gear 33. The uprighter cradles 35 are connected to an endless chain 67 trained over gears 68 and 69, the latter driven by a sprocket chain 70 which in turn is driven from the shaft 66. The uprighters 35 are swung from a recumbent position in which they receive the bottles from the chute 34, to an upright position by a stationary cam 71 for placing the bottles in upright position on the conveyor 30, as described in Patent No. 1,981,642, above referred to.

The cradle conveyor 40 and the fire-finishing mechanism are supported on a frame-work including a frame rectangular in cross section (see Figs. 2 and 6) comprising angle bars 73 extending lengthwise of the apparatus, end plates 74, lower plates 75, an upper plate 76 and a tubular frame member 77 extending lengthwise of the frame-work and attached to the end plates 74. The frame-work 73 to 76, rests on angle bars 78 arranged in pairs and extending transversely of the frame-work at intervals lengthwise thereof. Cross bars 79 bolted to the bars 78 and extending lengthwise beyond the latter, have secured thereto vertical frame members 80 to which are attached upper and lower channel guides or tracks 81 and 82 extending lengthwise of the frame for guiding the cradle conveyor chains.

Figure 5:
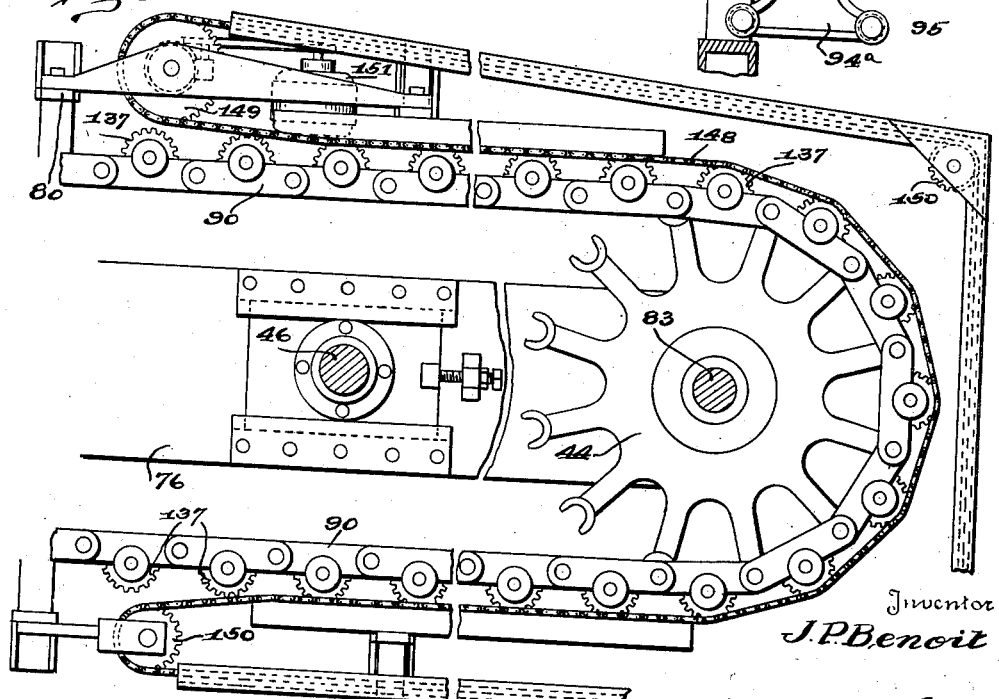
Fig. 5 is a fragmentary sectional plan view showing particularly the means for rotating and controlling the speed of rotation of the spindles by which the bottles are rotated during the fire-finishing operation.

The driving sprocket wheels for the conveyor 40 are mounted on a drive shaft 83 (Figs. 1, 2, 5) and include the upper sprocket wheel 44 and a lower sprocket wheel 44a. The shaft 83 is driven by an electric motor 85 (Fig. 1) operating thru a worm gear drive 86. The motor 85 is synchronized with the motor 60 for driving the several conveyors in synchronism and at the same linear speed.

The cradle conveyor 40 comprises upper and lower chains 90 and 91 (Figs. 3 to 8). The upper chain runs over the sprocket gears 43 and 44 and the lower chain over the sprocket gears 43a and 44a. As shown in Figs. 12 and 13 the chain 90 is made up of links connected by pivot pins 92 which are engaged by the forked ends 93 (Fig. 3) of the sprockets or arms of the driving gear. Alternate links of the chain 90 have formed integral therewith triangular shaped extension members 94 carrying guide rolls 95 which run on the track 81. The links of the lower chain 91 are also formed with similar extensions 94a carrying rolls running on the lower track 82.

Each of the cradle units includes a vertical lifting rod 97 having a slidable connection with a supporting bar 96 to permit up and down movement of the cradles. Each bar 96 is attached by bolts 96a to a link of the lower chain 91 and carries at its upper end a guide 98 for the lifting rod 97. The latter has secured to its lower end a guide 100 slidable on the bar 96. The bars 96 also have a fixed connection with the sprocket chain 90. The connecting means includes flanged extensions 101 (Figs. 12, 13) formed on the links of the chain. Each of the bars 96 has attached to its upper end a cradle carrying frame 102 to the upper end of which is secured a yoke 103. A cradle 104 is mounted in the yoke on trunnions 105 for oscillating movement. The cradle includes a bottle holder 106 comprising an annular series of fingers forming a basket shaped to receive the bottle. The weight of the cradle conveyor and parts carried thereby is supported by rolls 106a journalled on the lower chain links (Fig. 13) and running on a track 106b. A circular plate 106c (Fig. 17), bolted to the gear wheel 43a, provides a support for rolls 106b while travelling with the gear wheel.

The basket 106 has attached thereto a spindle 107 (Fig. 10) which is removably held in a tubular shaft 108 mounted for rotation in the cradle 104 and providing a swivel connection of the basket to the cradle. The spindle is held in position by spring actuated detents 109a mounted in a collar 109 attached to the shaft 108 for rotation therewith. The detents engage notches formed in the spindle. This construction permits the spindle to be replaced by others of different lengths for handling longer or shorter bottles.

The cradle 104 is oscillated about the trunnions 105 for inverting and reinverting the bottles by means including a segmental gear 110 attached to the cradle (see Fig. 9) and a rack bar 111. The rack bar is attached to a slide block 112 (Figs. 6 and 7) mounted for up and down sliding movement on the frame 102 and carrying a cam follower roll 113. Cam plates 115 and 116 are mounted on the frame plate 76 and each provided with cam tracks 117 and 118. The roll 113 runs on the upper cam tracks 117 which thus control the swinging movements of the cradle.

Means for lifting and lowering the cradle bodily includes a cam follower roll 120 on the rod 97. It will be noted that while the carrier is traversing the fire-finishing zone it is in its upwardly swung position with the bottle inverted. After the fire-finishing operation and as the cradle moves toward the takeoff conveyor, the cam follower roll 113 runs along one of the cam tracks 117 (Fig. 2) and swings the cradle downward about its trunnions 105, thereby swinging the bottle downward and reinverting it to an upright position in which it is placed on the takeoff conveyor 52.

Immediately after the bottle has been swung downward and placed on the conveyor 52 (see Fig. 2), the cradle is lifted bodily by means of a stationary cam 121a (Fig. 7) on which runs a cam follower roll 120 on the lifting rod 97. The cradle is thus withdrawn from the bottle while the latter advances with the conveyor 52. While the cradle travels around the gears 43, 43a, it is supported in its elevated position by a plate 121b which forms a continuation of the cam track 121a. The cradle is then lowered under the control of a cam track 121 down which the roll 120 runs. The cradles then remain in their lowered position until they have again passed through the fire-finishing zone.

In order to prevent the bottle from dropping out of the basket 106 during the inverting movements of the cradle a bottle supporting plate 122 is provided. This plate is carried on a pair of arms 123 pivoted to swing about the trunnions 105. A segmental pinion 124 attached to one of said arms, meshes with a rack bar 125 secured to the upper end of a rod 126. A connector block 126a attached to the rod 126, is slidable up and down on the frame 102 and carries a cam follower roll 127 which is adapted to run on the cam tracks 118.

A guide block 128 attached to the frame 102, provides a guideway for the rack 125 and also forms a stop in the path of the rod 126 to limit the upward movement of the rack bar. As shown in Fig. 6 the stop 128 holds the arms 123 in a downwardly inclined position with the bottom plate 122 at one side of the bottle conveyor. The cam tracks 117 and 118 (Fig. 2) are so shaped relatively that when the cradle 104 commences to swing the bottle upward, the bottom plate 122 remains in its lowered position until the bottle is brought over said plate. The rack bar 125 then commences its downward movement, the two rack bars moving down simultaneously so that the supporting plate 122 swings upwardly with the basket until brought to a substantially horizontal position. The upward movement of the supporting plate is then arrested while the basket continues its upward swing to a vertical position. When the inverted bottle is swung downward the bottom supporting plate 122 operates in the same manner to prevent the bottle from dropping from the basket during the latter half of the downward swinging movement of the cradle. When the cradles are lifted bodily to their elevated position shown at the right in Fig. 2 the cam rolls 127 engage the lower face of a stationary plate 129 and thereby hold the arms 123 in an outwardly inclined position as shown in Fig. 7, out of the path of the bottles.

The connection between the rod 126 and the slide block 126a (Figs. 8 and 11) comprises a detent 130 mounted in the slide block and held in yielding engagement with the rod by a spring 131. The rod may be formed with a notch to receive the detent. A similar connection is provided between the slide block 112 and the rack bar 111, comprising a spring actuated detent 132 (Fig. 8). These connections provide safety means by which the lifting frame is released from the rack and gear mechanism which swings the cradle and the bottom plate 122, in the event of any obstruction interfering with the normal swinging movements of said parts.

The cradle 104 is held steady in its downwardly swung position by means of a spring actuated latch 133 (Figs. 9 and 10) which is pivoted on the cradle and engages a keeper 134 secured to the lifting frame 102. This latch and keeper hold the cradle while the rack bar 111 is out of the control of the cam 117.

Means for rotating the bottles during the fire-finishing operation includes spindles 135 individual to the cradle units and connected to travel with the cradle conveyor. Referring to Figs. 8 and 12 to 14, each spindle 135 is square in cross section and has a bearing in a bushing 136 in which it is slidable up and down. The bushing is mounted for rotation within a tubular bearing 90a formed integral with the chain link 90. Means for rotating the spindle comprises the sprocket wheel 137 keyed to the bearing sleeve 136 and driven as presently described. The lower end portion of the spindle is round and mounted for rotation within a bearing block 138 which has a slidable connection with a vertical bar 139 (see Fig. 13) which is secured to the bar 96 by bolts 140 with a spacing block 141 between said bars. The means for lifting the spindle includes a tubular lifting member 142 thru which the spindle extends and within which it rotates. Said lifting member has a slidable connection with the bar 139 and carries a cam follower roll 143 which runs on a cam track 144. A connection between the parts 142 and 138 comprises a pair of coil tension springs 145 anchored at their opposite ends to the parts 142 and 138. The cam track 144 (see Fig. 2) comprises an inclined section 144a up which the cam rolls 143 travel as the spindles approach the fire-finishing zone thereby lifting the spindles into position for rotating the bottles which at this time are held by the cradles in an inverted position. A frictional driving connection between the spindle and the bottle carrier 106 is provided by a head 146 (Fig. 13) which is keyed to the spindle and carries a friction gasket 147 of rubber or the like to frictionally engage the collar 109. The cam track 144 is at a height to lift the connector 142 a short distance after the spindle has been lifted into driving connection with the bottle carrier, so that the springs 145 hold the spindle with a yielding pressure against the collar 109.

The means for rotating the spindles and controlling the speed of rotation (Figs. 5 and 12) comprises an endless chain 148 running in mesh with the sprocket wheels 137. The chain is trained over a driving sprocket wheel 149 and idler sprockets 150. The wheel 149 is driven by an electric motor 151. It will be noted that if the chain 148 is held stationary it will rotate the travelling spindles. By the use of the motor 151 the speed of rotation of the spindles can be either accelerated or reduced.

The fire-finishing mechanism illustrated in Figs. 2 and 15 to 22 will now be described. The fire-finishing units 47 which cooperate individually with the bottle carrying units or cradles, are connected to travel with the endless chain 87. The chain comprises pairs of links, each pair including a lower link 152 (Fig. 21) and an upper link 153, said pairs connected by pivot pins 154 which engage the gears 50 and 51. The weight of the chain and parts carried thereby is supported by rolls 155 connected to the lower links 152 and running in a channel shaped track 156. Rolls 157 on the pins 154 run in the channel track and guide the chain. The chain and parts carried thereby are supported on a frame-work comprising longitudinal bars 158 and transverse arms or brackets 158a to which the tracks 156 are secured. The chain is held against tilting movement under the weight of parts carried thereby, by means of a series of arms 159 in the form of plates riveted to the links 153 and extending inwardly with their inner ends entering, and traveling in slotted guide rails 161 mounted on bracket arms 160 on the brackets 158a.

The distributor 45 for the fuel gas is attached to the upper end of a tubular shaft 162 mounted for rotation about the column 46. Said shaft is driven from shaft 83 by means of the sprocket drive chain 163 running on a drive gear 164 on the shaft 83 and a driven gear 165 secured to the lower end of the shaft 162. The gears are so proportioned that the distributor 45 is given one complete rotation in the same length of time required for the burner carrying chain 87 to complete its circuit. The chain 87 travels at the same linear speed as the cradle conveyor.

The gas for the burner may be introduced thru a pipe 166 into the chamber 45a (Fig. 18) of the distributor, said gas preferably consisting of a mixture of a fuel gas and air or oxygen. Pipe connections from the distributor to the burners include pipes 167 attached to the distributor and provided with valves 168 by which the supply to any selected burners may be cut off. The gas passes thru fire traps 169 and thence thru pipe lines 171 individual to the burners 48 and 49.

The burners of each unit 47 and adjusting and control mechanism therefore are supported on a bracket 172 bolted to a chain link 153. The inner burner 48 is carried by a vertical bar 173 connected by bolts 174 (Fig. 21) to the front face of the bracket 172. The outer burner 49 is carried by vertical bar 175 which is mounted for up and down sliding movement on the bracket, under the control of a cam as hereinafter described. The mechanisms supported respectively by the bars 173 and 175, including the burners and various adjusting devices, are substantially similar. The mechanism carried by the bar 173 includes a slide block 176 adjustable up and down on the bar 173. The adjusting means comprises a screw 177 swiveled in an arm 178 fixed to the bar 173 and threaded thru a lug on the block 176. The burner 48 is connected by a shaft 179 to a vertically disposed arm 180 extending downward from and forming part of a horizontally disposed carrying frame including upper and lower horizontal bars 181 and 182 respectively. The bar 181 is slidably mounted in the block 176 permitting said frame to be adjusted horizontally by means of an adjusting screw 183 swiveled in an extension of the frame and screw threaded in a lug 185 on the block 176. The burner 48 is rotatably adjustable about a pivot 179 by means of an adjusting knob 186 on a shaft 187 having driving connection thru a pair of bevel gears 188 with a worm shaft 189 which drives a segmental worm gear 190 attached to the burner. The burner itself as shown in Fig. 20 is of conventional construction and need not be described in detail.

Figure 18:
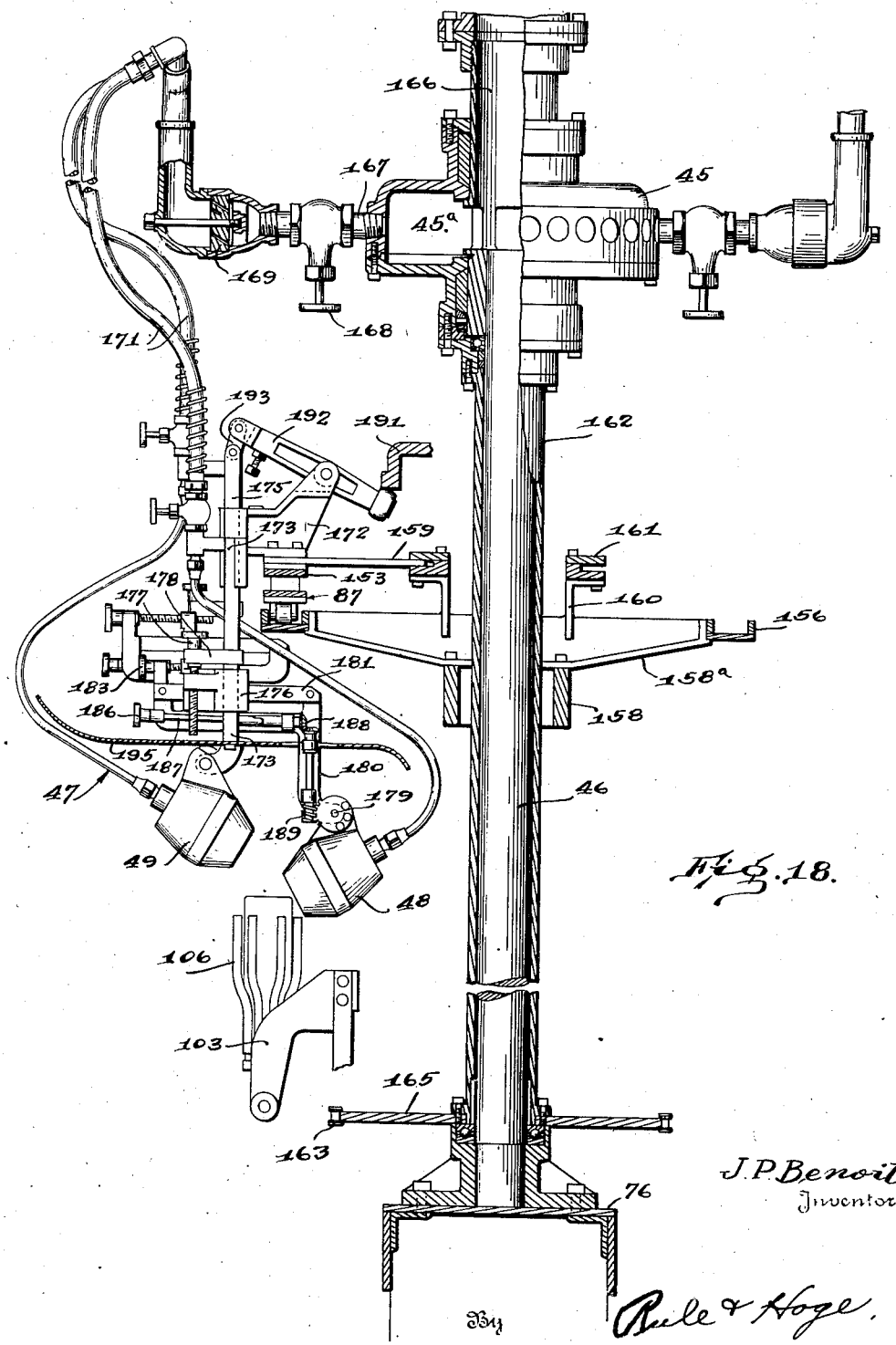
Fig. 18 is a part-sectional elevation at the line 18—18 on Fig. 1, showing the gas distributor and a burner unit.

The burner 49 is automatically lifted to the Fig. 18 position in order to clear the bottles as they are brought into the fire-finishing zone by the cradle conveyor, then lowered and again lifted for clearing the bottles as they advance beyond the fire-finishing zone. This up and down movement of the burner 49 is controlled by a stationary cam 191. Each burner unit includes a lever 192 fulcrumed on the bracket 172 and carrying at one end a roller running on the cam 191. The other end of the lever is connected thru a link 193 with the vertical slide bar 175. When a bottle has been brought into juxtaposition to the burner 48, the cam 191 operates to lower the burner 49 from the Fig. 18 position to the position shown in Fig. 19. The means for adjusting the burner 49 about its shaft and for adjusting it bodily in horizontal and vertical directions are substantially the same as the adjusting means for the burner 48.

In order to protect the mechanism immediately above the burners from the intense heat, I provide a shield comprising horizontally disposed plates 195 (Figs. 15, 16, 18, 19, 21) which travel with the burners. These plates are secured by attaching means 196 to the lower ends of the rods 173. The plates are of a width to overlap at all times during their travel and thereby form a continuous shield.

The takeoff mechanism (Figs. 1 and 23 to 27) by which the fire-finished bottles are taken from the cradle conveyor and transferred to the carrying-in conveyor 58, will now be described. The endless takeoff conveyor 52 comprises a chain made up of links 200 (Fig. 24) connected by pivot pins 201. Plates 202 are connected with the pivot pins and are shaped to provide a substantially continuous plane surface on which the bottles are supported. The front edge 203 of each plate is curved concentrically with its supporting pin and the opposite edge is a re-entrant curve to fit the next adjoining plate thereby permitting the plates to swing about their pivots as they pass around their gears without breaking the continuity of the supporting surface.

The take-off spider 55 comprises a hub keyed to the shaft 56 and formed with integral radial, hollow arms 204. The takeoff fingers 57 are attached to the outer ends of rods 205 which are mounted for lengthwise and rotatable movement in the hollow arms 204. Each rod 205 extends thru a sleeve 206 which has formed integral therewith, a stud 207 on which is mounted a cam follower roll 208. The roll runs on a cam track 209 formed on the periphery of a stationary cam disk 210, secured by bolts 211 to the upper flanged end of a tubular post 212 in which the shaft 56 is journalled. The sleeve 206 is held against movement lengthwise of the rod 205 in one direction by a collar 213 keyed to said rod. The rod is formed at its outer end with a head 214 provided with an eccentric opening to receive the shank of the finger 57, the head being split and clamped to said shank by a clamping bolt 215. Mounted within the hollow arm 204 is a tubular cam 216 held against movement by a pin 217, said cam being formed with spiral cam slots 218. A pin 219 extending thru the rod 205 runs in the cam slots which are shaped to rock the shaft and swing the takeoff finger 57 from its lowered position in which it lies in the horizontal plane to a position in which its forward end extends upwardly as shown at the left in Fig. 25.

As the takeoff spider rotates in a counter clockwise direction the takeoff fingers are brought in succession behind the bottles on the conveyor 52. As each finger travels with the conveyor around the axis of the spider, it is moved radially outward under the control of the stationary cam track 209, the spiral cams 218 at the same time swinging the fingers downwardly to a horizontal position. The cam follower roll 208 is held against its cam by a compression spring 220 mounted on a rod 221 which extends thru the stud 207 and forms a guide therefor. As the bottles approach the cross conveyor 58 they are deflected from the takeoff conveyor by a guide rail 222 preferably in the form of a spring rod adjustably secured at one end by a clamping bolt 223. A second guide rail 224 may be positioned at the opposite side of the path followed by the bottles. The takeoff fingers push the bottles from the conveyor 52 onto the conveyor 58 and are then retracted, preparatory to engaging succeeding bottles.

Figure 2:
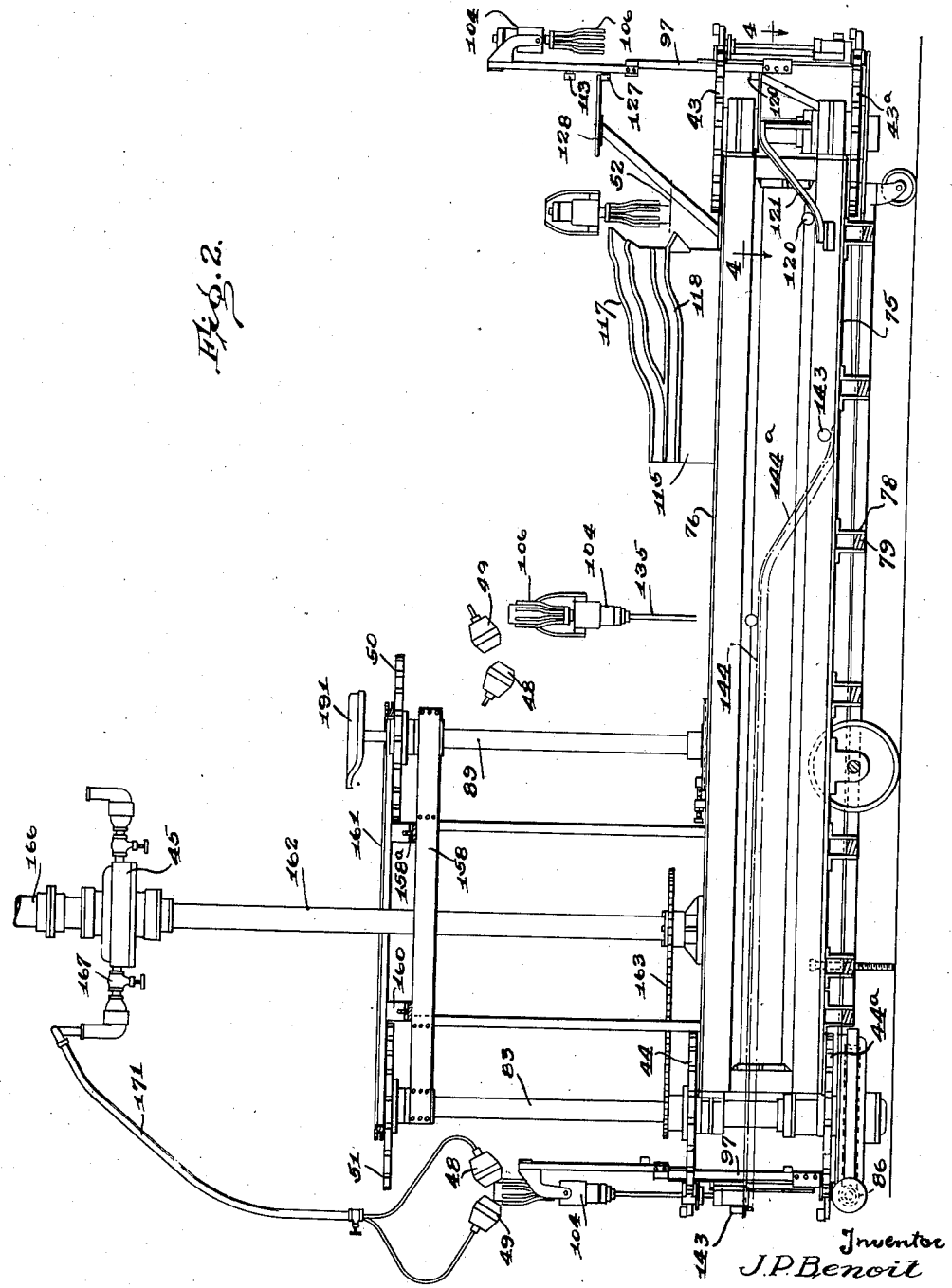
Fig. 2 is a partly diagrammatic elevation of the fire-polishing apparatus and cradle conveyor mechanism by which the articles are advanced to and through the fire-polishing zone.
Figure 3:
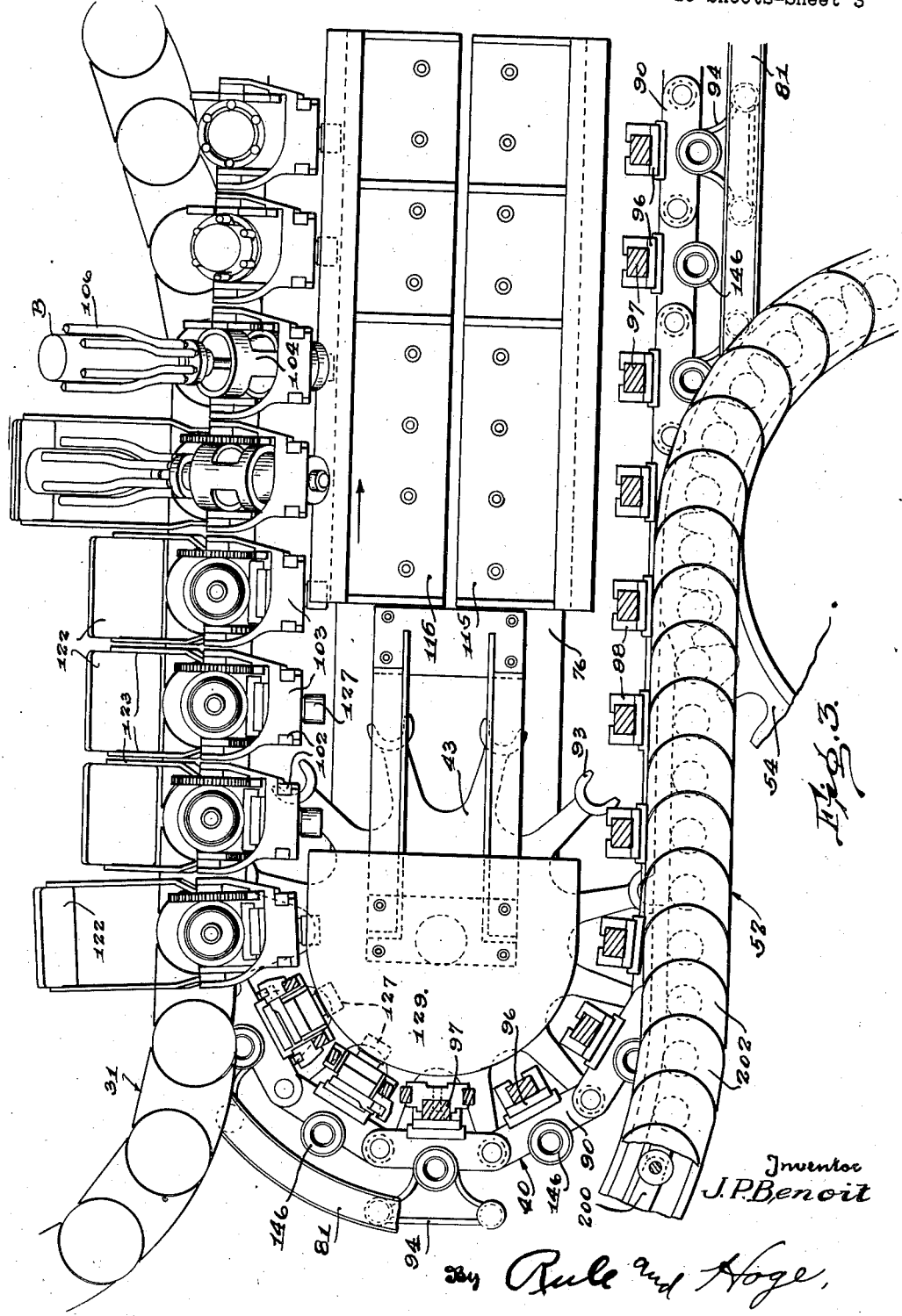
Fig. 3 is a sectional plan view of a portion of the cradle conveyor and on opposite sides thereof, of the uprighting conveyor and the takeoff conveyor respectively.
Figure 4:
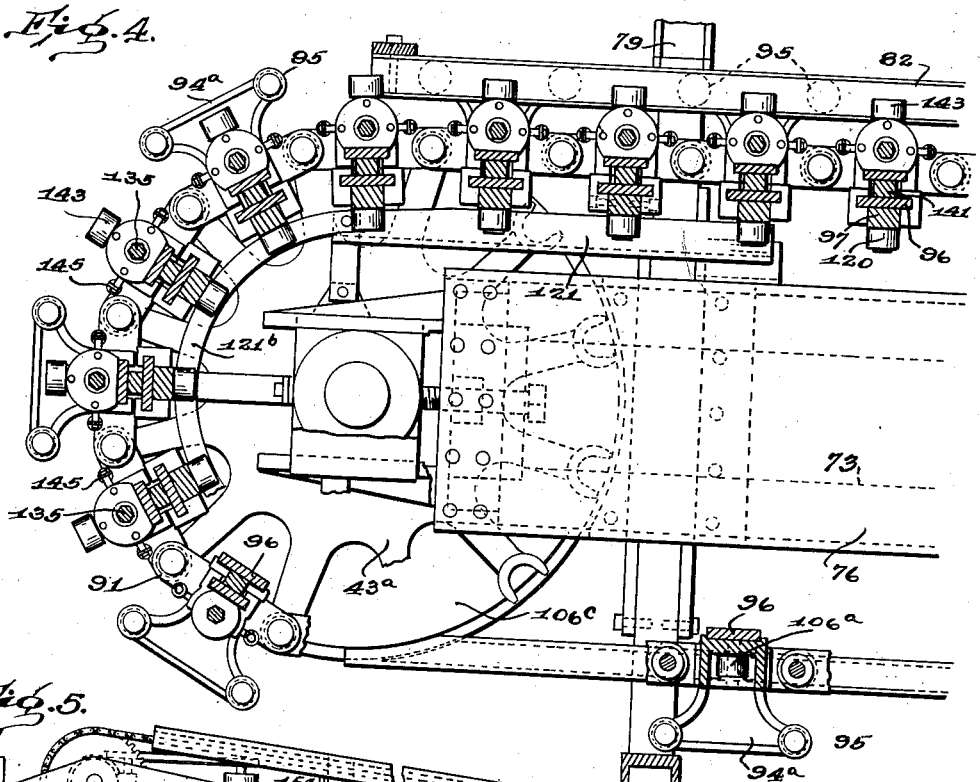
Fig. 4 is a section at the line 4—4 on Fig. 2 showing a portion of the cradle conveyor.

The operation of the mechanism as a whole may be summarized as follows: The bottles B delivered from the forming molds F (Fig. 1) slide down the chutes 34 to the cradles 35 and are placed by the cradles in upright position on the uprighter conveyor 31 which travels in a counter clockwise direction and thereby brings each upstanding bottle beneath and in register with a cradle 104 which has been lifted as shown in Fig. 7, the bottle receiving basket 106 being directly over the bottle. As the cradle conveyor travels forward along with that portion of the uprighter conveyor directly beneath, the cradles 104 are lowered so that the bottles enter the baskets 106 as shown at the left in Fig. 6, the lowering movement being under the control of the inclined cam track 121a (Fig. 7). Immediately after a bottle is thus received in its basket the cradle is inverted under the control of the stationary cam track 117 (Figs. 2 and 6) thereby swinging the bottle upwardly to an inverted position. Then as the inverted bottle advances toward the fire-finishing zone, the bottle rotating spindle 135 which is directly beneath it, is moved upward by the cam 144 to operative position (Figs. 2, 13). The spindle is then rotated by the mechanism shown in Fig. 5 and rotates the bottle.

While the bottle is thus rotated a pair of burners 48 and 49 applies an intensely hot flame to the bottom surface of the bottle by which a thin surface layer of the glass is heated to a substantially liquid or molten condition in which it forms a smooth glazed surface, obliterating the usual shear marks. This glazing operation is facilitated by the force of the flames directed against said surface which tends to spread the softened glass in a manner to eliminate cracks, fissures, scars and the like.

A sufficient number of burner units is employed to take care of a large output from the bottle blowing machine, the bottles passing in rapid succession thru the fire-finishing zone. As the bottles pass beyond the burners and approach the takeoff conveyor 52 the cradles are reinverted, swinging the bottles downward as indicated at the right in Fig. 6 and positioning them on the conveyor 52. The cradle is then lifted to the broken line position, withdrawing the basket 106 upwardly to clear the bottle which is then carried by the conveyor 52 to the takeoff spider 55 (Figs. 1 and 23) by which it is transferred to the belt conveyor 58.

Modifications may be resorted to within the spirit and scope of my invention.

I claim:

1. The combination of a horizontally traveling uprighter conveyor having a traveling supporting surface on which articles are placed and supported in upright position, a cradle conveyor traveling in a path having a portion thereof adjacent to a portion of the path of said uprighter conveyor, means for driving said conveyors in synchronism, a series of cradle units carried by the cradle conveyor and each comprising a cradle mounted to swing about a horizontal axis, means for swinging the cradles about said axes and thereby inverting the cradles, and means for automatically transferring the articles from the uprighter conveyor to the said cradles while the latter are inverted.

2. The combination of an endless uprighter conveyor, an endless cradle conveyor, an endless takeoff conveyor, means for continuously driving said conveyors in synchronism, said cradle conveyor comprising a series of cradle units, each said unit including a cradle, a basket carried by the cradle to receive articles from the uprighter conveyor, and automatic means for swinging the cradle about a horizontal axis at predetermined points in its path of travel and thereby inverting and reinverting articles carried in the basket, said cradle conveyor being positioned to travel over a portion of the uprighter conveyor and carry the inverted cradles over said portion of the uprighter conveyor, means for lowering the cradles while inverted and traveling over the uprighter conveyor and thereby lowering the inverted baskets to receive the articles from the uprighter conveyor, said cradle swinging means being timed to reinvert the cradles with the articles therein and thereby invert the articles and thereafter to invert the cradles and thereby reinvert the articles therein, said takeoff conveyor being positioned to travel beneath the reinverted articles, and means for lifting the cradles while the articles are over the take-off conveyor and thereby withdrawing the baskets and leaving the articles supported on the takeoff conveyor.

3. Fire-finishing apparatus comprising in combination, a traveling cradle conveyor, means for driving the conveyor, a series of cradle units connected to travel with the conveyor, each said unit comprising a cradle mounted to rock about an axis and a basket carried with the cradle for receiving articles and having a swivel connection with the cradle, spindles individual to said units and connected to travel with the conveyor, means for bringing the spindles into operative relation to the baskets and the articles supported therein, with the spindles in line with the swivels, and means for rotating the spindles and thereby rotating the baskets with the said articles therein about said swivels.

4. Fire-finishing apparatus comprising in combination, a traveling cradle conveyor, means for drving the conveyor, a series of cradle units connected to travel with the conveyor, each said unit comprising a cradle mounted to rock about an axis and a basket carried with the cradle for receiving articles and having a swivel connection with the cradle, spindles individual to said units and connected to travel with the conveyor, means for bringing the spindles into operative relation to the baskets and the articles supported therein, with the spindles in line with the swivels, means for rotating the spindles and thereby rotating the baskets with the said articles therein about said swivels, said spindle rotating means including a sprocket chain, sprocket gears connected to the spindles and running on said chain as they travel with the cradle conveyor, and means for driving said sprocket chain.

5. The combination of an endless cradle conveyor mounted to travel in a horizontal closed path, a series of cradle units connected to travel with the conveyor, each said unit comprising a supporting frame, a cradle carried by said frame and a basket carried by the cradle, said cradles being pivotally mounted on the said frames to swing about a horizontal axis for inverting and reinverting the cradles and baskets, said cradle carrying frame being mounted for up-and-down movement relative to the cradle conveyor, a cam track, cam follower rolls connected to said frames and running on said track, said track being shaped and positioned to lift and lower said frames, means for positioning articles beneath said baskets while the frames are in lifted and inverted position and holding the articles in position to enter the baskets when the frames are lowered, bottom supports carried by said frames, and means for moving said bottom supports into position to engage beneath the articles received in said baskets and support them during a portion of the inverting movement of the cradles.

6. The combination of an endless conveyor, means for driving it and guiding it in a horizontal closed path, a cradle unit connected to travel with the conveyor, said unit including a cradle supporting frame, a cradle mounted in said frame for swinging movement about a horizontal axis, means for swinging the cradle, a basket carried by said cradle and connected to swing with the cradle from a position in which it extends downward from the cradle to an inverted position above the said axis of the cradle, a bottom supporting plate mounted to swing about said axis, a stationary cam track, a cam follower roll running thereon, and means providing operating connections between said roll and said bottom supporting plate for controlling the swinging movements of said plate, said cam being shaped and positioned to cause said plate to swing upwardly with the basket and an article supported therein to an intermediate position during the inverting movement of the basket and to then arrest the movement of the bottom plate while the basket continues its upward movement.

7. The combination of a horizontally traveling conveyor, means for driving the conveyor, a cradle unit connected to travel with the conveyor, said unit including a supporting frame, a cradle pivoted thereto for rocking movement about a horizontal axis, a basket for holding a work-piece, said basket being carried by the cradle and connected to swing with the cradle from a depending position below said pivot to an upright position above the pivot, and means for swinging the cradle including a stationary cam track, a cam roll running thereon, and means providing operating connections between the cam roll and the cradle.

8. The combination of a horizontally traveling conveyor, means for driving the conveyor, a cradle unit connected to travel with the conveyor, said unit including a supporting frame, a cradle pivoted thereto for rocking movement about a horizontal axis, a basket for holding a work-piece, said basket being carried by the cradle and connected to swing with the cradle from a depending position below said pivot to an upright position above the pivot, and means for swinging the cradle including a stationary cam track, a cam roll running thereon, means providing operating connections between the cam roll and the cradle, a bottom supporting plate, an arm carrying said plate and mounted to swing about the axis of said cradle pivot, means for swinging said arm and supporting plate including a gear connected to said arm, a rack engaging said gear, a second cam track, and means providing operating connections between the second cam track and said rack, said second track being shaped and positioned to swing the bottom support with said basket during a portion of the upward swinging movement of the basket and then arrest the upward movement of the bottom support while the basket continues its upward movement.

9. The combination of a conveyor mounted to travel horizontally, means for driving the conveyor, a cradle unit connected to travel with the conveyor, said unit including a supporting frame, a cradle pivoted thereto for rocking movement about a horizontal axis, a basket for holding a work-piece carried by the cradle and connected to swing therewith from a depending position below said pivot to upright position about the pivot, and means for swinging the cradle, a spindle connected to travel with the conveyor and positioned beneath the cradle, a stationary cam track, means providing operating connections between the cam track and the spindle for lifting the spindle into operative relation to the said basket after the latter has been swung to an upright position, and means for rotating the spindle and thereby rotating the basket with the work-piece therein.

10. The combination of a horizontally traveling conveyor, means for driving it, a work-holder carried with the conveyor, a vertical spindle connected to travel with the conveyor and positioned beneath the work-holder, a stationary cam track, a cam follower roll running thereon, a spindle lifting device carrying said roll, springs connecting said lifting device and the spindle, the said cam track being shaped and positioned to lift the said spindle lifting device and thereby lift the spindle into engagement with the work-holder, and means for rotating the spindle.

11. The combination of an endless chain conveyor mounted to travel in a horizontal path and including upper and lower parallel endless chains vertically spaced apart, vertical guide bars, each rigidly connected to links of the lower and upper chains, work-holder frames individual to said guide bars, vertical rods carrying said frames, guides attached to said rods and connected to and slidable up and down on said guide bars between said chains, a stationary cam track, and cam follower rolls running on said track and connected to said frames for lifting and lowering them.

12. The combination of an endless chain conveyor mounted to travel in a horizontal path and including upper and lower endless chains, vertical guide bars, each rigidly connected to links of the lower and upper chains, work-holder frames individual to said guide bars, vertical rods slidably connected to said guide bars and carrying said frames, a stationary cam track, cam follower rolls running on said track and connected to said frames for lifting and lowering them, work-holders rotatably supported on said frames, vertical spindles connected to travel with said chains, means for lifting and lowering the spindles during their travel with said chains and thereby engaging the spindles with and disengaging them from said work-holders, and means for rotating the spindles while in engagement with the work-holders and thereby rotating the work-holders.

13. The combination of a horizontally traveling conveyor, a cradle unit connected to travel therewith, said unit comprising a cradle supporting frame, a cradle pivotally mounted therein to rock about a horizontal axis, a work-piece holding basket, a vertical stem connected to the basket, said stem being rotatably supported in the cradle, and means for rotating said stem about its axis and thereby rotating the basket and article supported therein.

14. The combination of a horizontally disposed endless conveyor, means for driving it in a closed horizontal path, a cradle unit connected to travel with the conveyor, said unit comprising a supporting frame, a cradle pivotally mounted in said frame for rocking movement about a horizontal axis, an article holding basket, a stem thereon, extending perpendicular to the said axis and providing a swivel connection of the basket to the cradle, and automatic means for rocking the cradle and inverting the basket and an article supported therein when the cradle reaches a predetermined position during its travel with the conveyor.

15. The combination of a horizontally disposed endless conveyor, means for driving it in a closed horizontal path, a cradle unit connected to travel with the conveyor, said unit comprising a supporting frame, a cradle pivotally mounted in said frame for rocking movement about a horizontal axis, an article holding basket, a stem thereon, extending perpendicular to the said axis and providing a swivel connection of the basket to the cradle, and automatic means for rocking the cradle and inverting the basket and an article supported therein when the cradle reaches a predetermined position during its travel with the conveyor, said means for rocking the cradle comprising a rack bar mounted to travel with the conveyor, a pinion mounted on the cradle and driven by the rack bar, a stationary cam, and means providing operating connections between the cam and the rack bar.

16. The combination of a horizontally disposed endless conveyor, means for driving it in a closed horizontal path, a cradle unit connected to travel with the conveyor, said unit comprising a supporting frame, a cradle pivotally mounted in said frame for rocking movement about a horizontal axis, an article holding basket, a stem connected thereto, said stem journalled in said cradle and extending perpendicular to the said axis, automatic means for rocking the cradle and inverting the basket and an article supported therein when the cradle reaches a predetermined position during its travel with the conveyor, said means for rocking the cradle comprising a rack bar mounted to travel with the conveyor, a pinion mounted on the cradle and driven by the rack bar, a stationary cam, means providing operating connections between the cam and the rack bar, a spring actuated latch, and a keeper therefor, said latch and keeper being mounted on the cradle and said frame and positioned and arranged to yieldingly hold the cradle in a predetermined position of rotation independently of the rack bar and pinion.

17. The combination of a horizontally disposed endless conveyor, means for driving it in a closed horizontal path, a cradle unit connected to travel with the conveyor, said unit comprising a supporting frame, a cradle pivotally mounted in said frame for rocking movement about a horizontal axis, an article holding basket, a stem thereon, extending perpendicular to the said axis and providing a swivel connection of the basket to the cradle, automatic means for rocking the cradle and inverting the basket and an article supported therein when the cradle reaches a predetermined position during its travel with the conveyor, a spindle mounted to travel with the conveyor, means for moving the spindle automatically into and out of driving relation to the said stem, and means for rotating the spindle while in said driving relation and thereby rotating said basket.

18. The combination of a conveyor, a take-off spider for removing articles from the conveyor, said spider being mounted for rotation about a vertical axis and comprising arms radial to said axis, curved fingers carried by said arms and extending outwardly over the conveyor, means for driving the conveyor, means for rotating the spider, and cam means for rocking the fingers and moving them lengthwise of said arms.

19. A takeoff mechanism comprising an endless conveyor, a gear wheel over which the conveyor is trained, means for rotating the gear wheel, a spider mounted concentrically with the gear wheel for rotation therewith and comprising an annular series of radial hollow arms, fingers individual to said arms and projecting radially outwardly therefrom, spiral cams within said hollow arms, means providing operating connections between the spiral cams and said fingers, a stationary cam track surrounding the axis of said spider, cam follower rolls individual to said arms and mounted for movement lengthwise of the arms, said rolls running on said stationary track, and operating connections between said rolls and said fingers for moving the latter lengthwise of the arms and causing them to be rotated by the spiral cams.

20. The combination of a horizontally-disposed traveling conveyor, a take-off spider mounted for rotation about a vertical axis, said spider comprising arms radial to said axis, fingers individual to and carried by said arms and projecting radially outward therefrom, said spider being positioned to cause said fingers to travel during part of their rotation in a path overlying a portion of the conveyor, means for rotating the spider, and automatic means for rotating the fingers about the longitudinal axes of their said arms and for reciprocating the fingers lengthwise of their respective arms.

21. The combination of a horizontally-disposed endless conveyor, means for driving the conveyor in a closed path, a take-off spider mounted for rotation about a vertical axis, said spider comprising radial arms, fingers individual to and carried by said arms and extending outwardly from the outer ends of said arms, means for guiding the conveyor in a path comprising a portion concentric with said axis and beneath said fingers, and automatic means for moving said fingers lengthwise of their carrying arms.

22. The combination of a horizontally-disposed endless conveyor, means for driving the conveyor in a closed path, a take-off spider mounted for rotation about a vertical axis, said spider comprising radial arms, fingers individual to and carried by said arms and extending outwardly from the outer ends of said arms, means for guiding the conveyor in a path comprising a portion concentric with said axis, said fingers extending over said portion of the conveyor path, and stationary guiding means for guiding articles away from the conveyor at a point in the path of said fingers.

23. The combination of a horizontally traveling endless chain conveyor, means for driving the conveyor in a closed path, said conveyor comprising an upper chain and a lower chain vertically spaced therefrom, vertical connector bars extending between said chains and each rigidly attached to links of said chains, rolls carried by and positioned beneath the lower chain, a horizontal track on which said rolls run, horizontally-disposed arms rigidly connected with links of the upper and lower chains respectively and extending laterally therefrom, rolls mounted on the outer ends of said arms for rotation about vertical axes, and stationary guide rails for said last mentioned rolls providing channels in which the rolls run and by which the conveyor is guided.

JOSEPH P. BENOIT.